United States Patent

[11] 3,538,947

| [72] | Inventors | Heinz Leiber<br>Leimen, and<br>Dietrich Brunner, Edingen, Germany |
|---|---|---|
| [21] | Appl. No. | 778,456 |
| [22] | Filed | Nov. 25, 1968 |
| [45] | Patented | Nov. 10, 1970 |
| [73] | Assignee | Teldix G.m.b.H.<br>Heidelberg, Germany |
| [32] | Priority | Nov. 27, 1967 |
| [33] | | Germany |
| [31] | | T 23,382 |

[54] MULTIPLE VALVE ARAANGEMENT
9 Claims, 5 Drawing Figs.

[52] U.S. Cl. ................................................ 137/550,
137/608
[51] Int. Cl. ............................................ F16k 11/20
[50] Field of Search ..................................... 137/608;
251/367

[56] References Cited
UNITED STATES PATENTS

| 2,266,817 | 12/1941 | Schober | 137/608X |
| 2,406,129 | 8/1946 | Blease | 137/608X |
| 3,002,530 | 10/1961 | Gibbs | 137/608X |

*Primary Examiner*—Henry T. Klinksiek
*Attorney*—Spencer and Kaye

ABSTRACT: A multiple valve arrangement suitable, for example, for controlling the flow of brake fluid in a vehicle brake control system for preventing braked wheels from locking. The arrangement includes a plurality of valve elements, each having a valve body with opposite ends and at least one fluid opening at each end, and two plate-shaped holding members which clamp the valve elements between them and engage the ends thereof. The holding members are provided with channels which communicate with the openings in the valve bodies, and, if necessary, interconnect the openings of two or more valve bodies.

Patented Nov. 10, 1970 3,538,947

INVENTORS:
Heinz Leiber
Dietrich Brunner
BY
Spencer & Kaye
Attorneys

INVENTORS:
Heinz Leiber
Dietrich Brunner
BY Spencer & Kaye
Attorneys

MULTIPLE VALVE ARRANGEMENT

CROSS REFERENCE TO RELATED APPLICATION

The subject matter of this application is related to that disclosed in the copending U.S. Pat. application Ser. No. 778,716 filed Nov. 25, 1968, of Heinz Leiber.

BACKGROUND OF THE INVENTION

The present invention relates to a multiple valve arrangement which may be used, for example, as a pressure control device in a hydraulic or a pneumatic system.

Hydraulic or pneumatic pressure control units for controlling the flow of a fluid pressure medium between a plurality of inlet-outlet terminals are normally constructed as individualized, integrated devices. Each unit is separately designed and constructed of specially designed parts which form the various valves, etc., of the device. These prior art units must be considered "special purpose" devices since, once designed, each unit can be utilized only in the application for which it was intended.

SUMMARY OF THE INVENTION

It is an object of the present invention to provide a multiple valve arrangement which may be easily constructed to effect any desired hydraulic or pneumatic control functions.

It is a further object to provide a multiple valve arrangement which is inexpensive and easy to manufacture. More particularly, it is an object that the assembly of the valve arrangement be suitable for mass production techniques.

A still further object of the present invention is to provide a multiple valve arrangement which affords a minimum of resistance to the flow of a fluid pressure medium from one fluid terminal to another.

These objects, as well as other objects which will become apparent in the discussion that follows, are achieved, according to the present invention, by providing a multiple valve arrangement having a number of individual valve elements clamped between two platelike holding members. The valve elements have valve bodies which, for example, may be of cylindrical or prismatic shape and which have fluid inlet-outlet openings at their opposite ends. The holding members engage with the ends of the valve bodies and are provided with fluid channels which communicate with the valve fluid openings. Where necessary, these fluid channels in one or both of the holding members, can interconnect the fluid openings of two or more of the valve elements. The valve elements are preferably provided with magnet windings so as to be actuated electromagnetically.

According to a particular embodiment of the invention which results in an additional simplification during manufacture, pairs of valve elements are aligned on a common axis end-to-end so that their abutting fluid openings will be connected together.

In the case where the multiple valve arrangement according to the present invention is constructed with miniature valve elements, it is further suggested that the inlet-outlet openings of the individual valves be provided with dirt-catching filters since the inflow of small particles of dirt can easily cause such miniature valves to fail.

DESCRIPTION OF THE PREFERRED EMBODIMENTS

Figure 1:
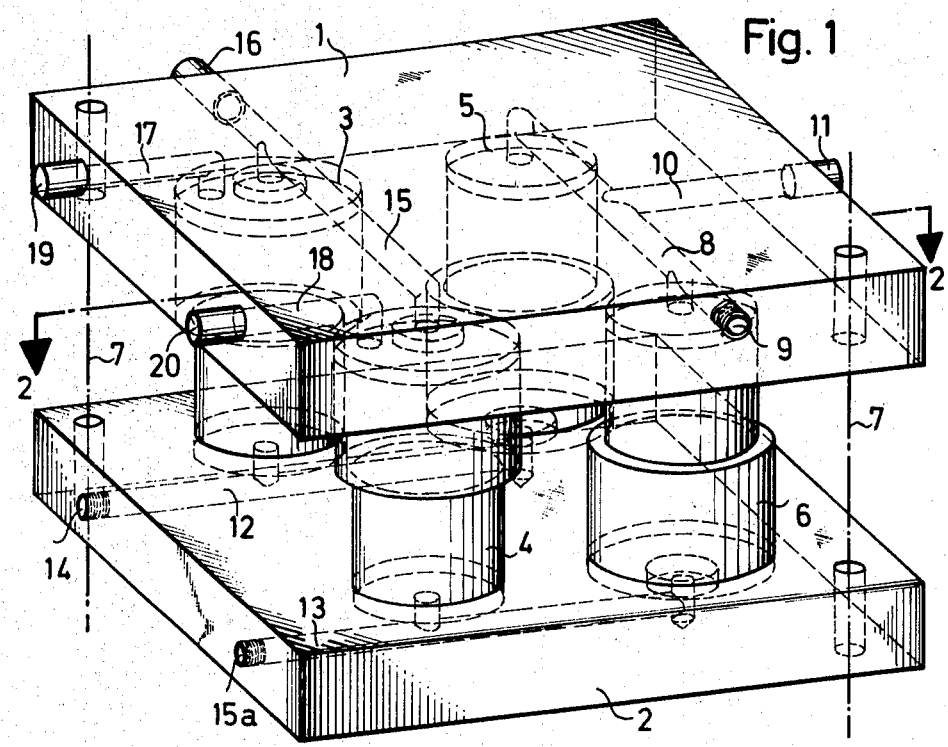
FIG. 1 is a representational diagram, in perspective, of a first embodiment of the multiple valve arrangement according to the present invention. In this embodiment the axes of the individual valve elements are arranged in parallel.
Figure 2:
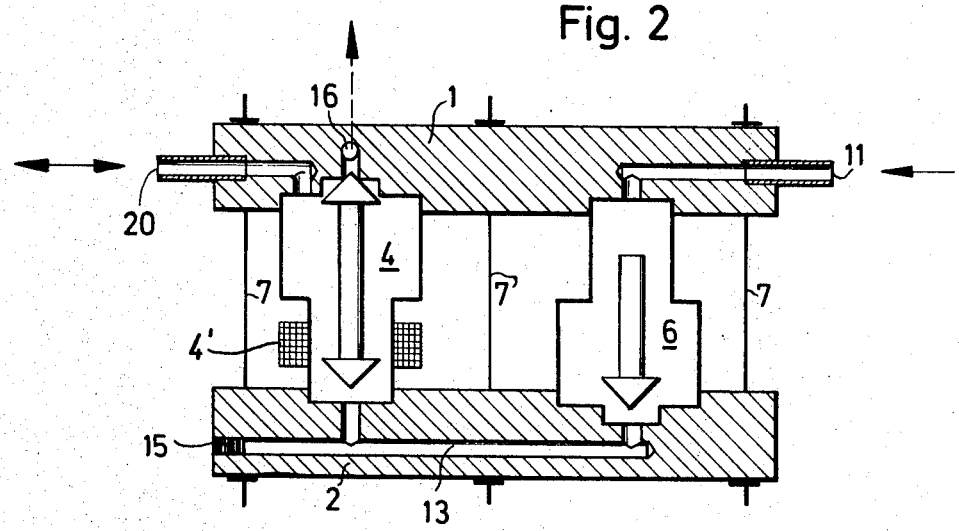
FIG. 2 is a cross-sectional view taken along the line 2–2 in the arrangement of FIG. 1.
Figure 3:
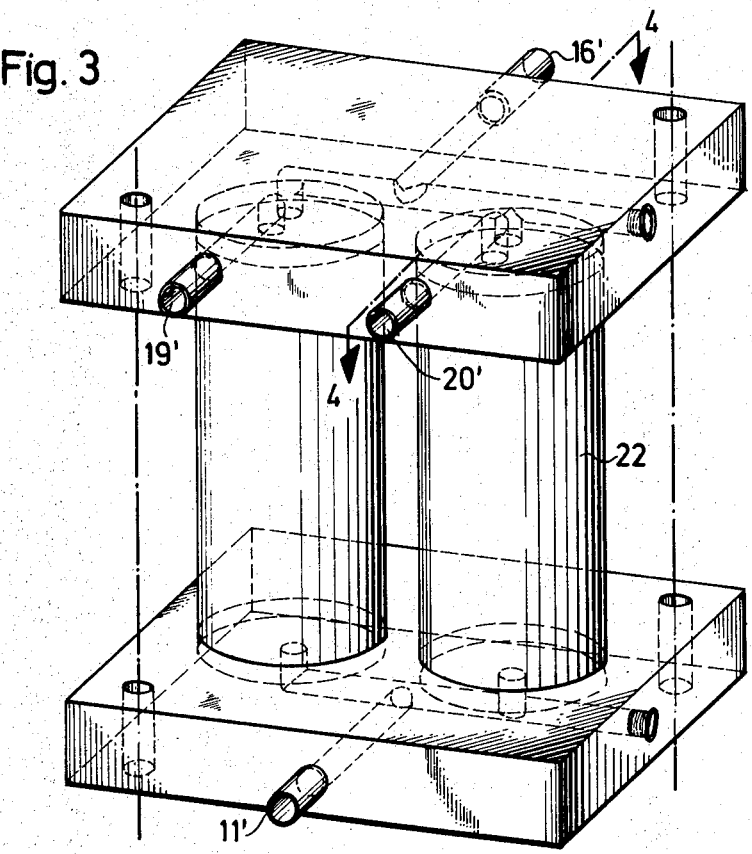
FIG. 3 is a representational diagram, in perspective, of a second embodiment of the multiple valve arrangement according to the present invention. In this embodiment pairs of valves are arranged on common axes.
Figure 4:
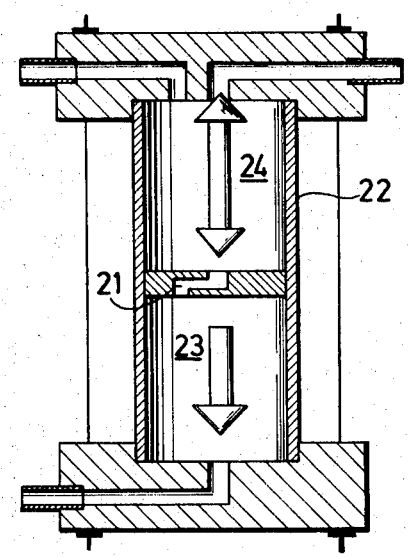
FIG. 4 is a cross-sectional view taken along the line 4–4 of the arrangement of FIG. 3.

Referring now to the drawings, FIGS. 1 and 2 illustrate in perspective and in cross section, respectively, a first preferred embodiment of the present invention. These figures show two plates 1 and 2 which hold four valves 3, 4, 5 and 6 between them. The two plates are bolted together with a number of clamping screws 7 which are schematically indicated with dot/dashed lines so that sufficient pressure is applied to the seals between the plates and the valves to prevent the leakage of fluid. The valves can be of a known type having end-positioned fluid passages. They could be constituted by the valves disclosed in U.S. Pat. application Ser. No. 680,366, filed on Nov. 3, 1967 by Heinz Leiber. The valves 3–6, as well as the corresponding valves of the embodiment of FIGS. 3 and 4, are, as noted above, preferably of the electromagnetically actuated type and for this purpose could each include an actuating winding such as the winding 4' shown for valve 4 in FIG. 2.

As is shown by dashed lines in FIG. 1 and in cross section in FIG. 2, the two plates 1 and 2 are provided with a number of channels 8, 10, 12, 13, 15, 17 and 18 which communicate with the outside and with various ones of the fluid openings of the valves. These channels may be drilled in any arbitrary way to impart the desired control function to the resulting control unit. Although the channels can communicate with the outside through the top and bottom faces of the plates 1 and 2, respectively, it is convenient if the inlet and outlet openings of the control unit are arranged at the lateral edges of the plates. If necessary, these inlet and outlet openings can be provided with connecting pipes 11, 16, 19 and 20.

When it is necessary to interconnect the fluid openings of two or more valves, the channels in the plates 1 and 2 can be drilled from points on the lateral plate edges. In this case, these outside openings of the channels may be closed by means of plugs 9, 14 and 15.

Further details of the particular valve arrangement shown in FIGS. 1 and 2 will be set forth below in connection with a particular preferred application of the multiple valve arrangement as an antiwheel-locking brake control unit.

FIG. 3 and 4 illustrate a second preferred embodiment of the multiple valve arrangement according to the present invention. As in the embodiment of FIGS. 1 and 2, this valve arrangement also comprises four individual valve elements; in this case, however, the valve elements are divided into pairs and the elements of each pair arranged end-to-end on a common axis. For the sake of clarity, the valve connecting channels are arranged, in the embodiment of FIGS. 3 and 4, so that this multiple valve arrangement can be used to serve the same control function as the valve arrangement embodiment of FIGS. 1 and 2. The connecting channels designated 11', 16', 19' and 20' in FIG. 3 correspond to the respective channels 11, 16, 19 and 20 in the valve arrangement of FIG. 1.

The valve elements 23 and 24 shown in FIG. 4 correspond to the valve elements 6 and 4, respectively, in FIG. 2. Instead of being connected by a channel 13 in the plate 2 as in FIG. 2, these valves 23 and 24 are arranged end-to-end within a tubular housing 22 and connected by a short channel 21 within the housing.

Although the two preferred embodiments of FIGS. 1 and 2, and FIGS. 3 and 4 have been described above in connection with a particular pressure control unit having four valve elements interconnected in a particular way, it will be understood that the multiple valve arrangement according to the present invention may be designed to serve any desired control function. Indeed, a principal advantage of the multiple valve arrangement according to the present invention is that the plates 1 and 2 may easily be drilled to accommodate any number of valve elements interconnected in any arbitrary way.

Figure 5:
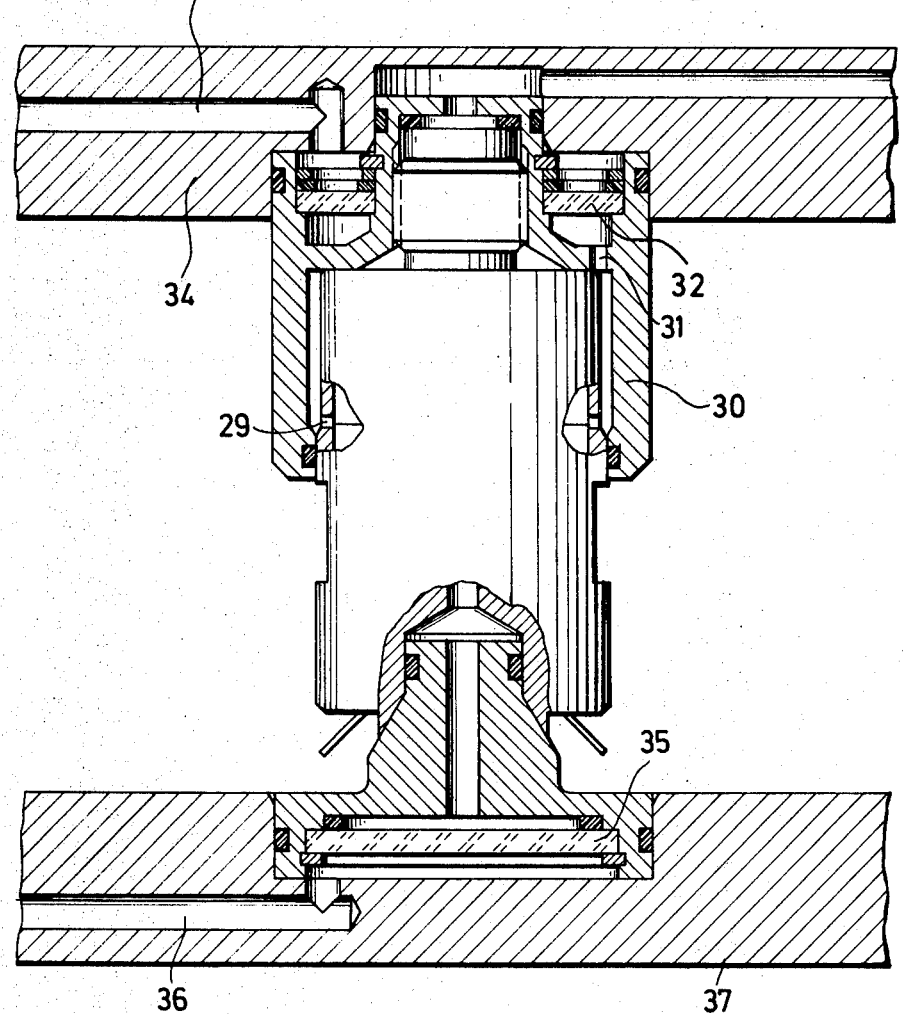
FIG. 5 is a cross-sectional view through a single valve element in the apparatus of FIG. 1 showing the arrangement of dirt-catching filters.

The constructional details of the multiple valve arrangement embodiment of FIGS. 1 and 2 are illustrated in FIG. 5. FIG. 5 shows a section through one valve element as it can be employed in the arrangement of FIG. 1. With this three-way valve element, the fluid outlet is formed by a plurality of openings 29 extending radially through the actual valve housing. Fluid flowing through these openings is collected by a collar 30 and passed through a number of axially extending openings 31, and through a dirt filter 32 to a channel 33 in the plate 34.

Another dirt filter 35 is also provided at the opposite end of the valve element to prevent entrance of particles of dirt which flow in through the channel 36 in the plate 37.

The multiple valve arrangement according to the present invention is especially suitable for use as a pressure control unit to regulate the brake pressure applied to one or more wheels of a vehicle having a hydraulic brake system. This brake pressure regulation is effected in response to wheel variables such as velocity and acceleration (deceleration) in such a way as to prevent each individual vehicle wheel from skidding or "locking" when the brakes are applied.

One particular type of antiwheel-locking brake control system automatically regulates the hydraulic pressure applied through one or more wheel brake cylinders with the aid of two individually electromagnetically controlled valves. One of these valves — a so-called "inlet valve" — is arranged in the path of the inlet line which connects the master brake cylinder with the particular wheel brake cylinder or cylinders to be controlled. The other valve — the so-called "outlet valve" — lies in the path of an outlet line which connects the wheel brake cylinder or cylinders with a relatively low pressure outlet, such as a brake fluid reservoir.

Antiwheel-locking brake control systems of the type just described, which have two independently actuated valves for each brake circuit to be regulated, admit of only three valve position combinations:

1. The normal valve positions with the inlet valve open and the outlet valve closed. With this position combination the brake pressure applied to the regulated brake or brakes will be dependent upon the pressure developed by the master brake cylinder.

2. The "pressure constant" valve positions where both valves are closed. With this combination of valve positions the regulated pressure at the wheel brake cylinder or cylinders will remain substantially constant.

3. The outlet combination of valve positions where the inlet valve is closed and the outlet valve is open. With this combination of positions the brake pressure applied to the wheel brake cylinder or cylinders will fall.

In a particular modification of this basic type of antiwheel-locking control system, a three-way valve is provided as the outlet valve. This outlet valve is connected in the hydraulic control system such that in one position it opens the path between the inlet valve and the wheel brake cylinder and blocks the path to the pressure outlet, and in the other position it opens the path to the pressure outlet and blocks the inflow of fluid from the inlet valve. This particular embodiment of the antiwheel-locking brake control system is described in detail in the copending U.S. Pat. application Ser. No. 778,716, referred to at the beginning of this specification.

The multiple valve arrangement embodiments shown in FIGS. 1—4 illustrate the use of the present invention as a pressure control unit in the antiwheel-locking brake control system just described. The four valves employed in the embodiments of FIGS. 1—4 are sufficient to individually control two of the vehicle wheel brakes. The respective embodiments may, therefore, be associated, for example, with one axle of the braked vehicle.

In the embodiment of FIGS. 1 and 2, the valve elements 3 and 4 constitute the three-way outlet valves and the valve elements 5 and 6 form the two-way inlet valves. In the embodiment of FIG. 4 the valve element 24 is the three-way outlet valve while the valve element 23 is the two-way inlet valve.

As may be seen in FIG. 1, the inlets of the inlet valves 5 and 6 are connected together by a channel 8. This channel is closed at the end from where it was drilled by a plug 9. A further channel 10 connects the channel 8 to the inlet pipe 11. Brake fluid is supplied under pressure to this inlet pipe from the master brake cylinder or, in the case of brake systems having a pneumatically actuated booster, from the secondary or hydraulic cylinder thereof.

The outlets of the inlet valves are connected to the inlets of the outlet valves by means of the channels 12 and 13. These channels are also closed by plugs 14 and 15.

The three-way outlet valves are provided with two outlets. The central outlets of the two valves which, as shown in FIG. 2, can be blocked by the valve-closing element, are connected together by a channel 15 which leads to a common outlet pipe 16. This outlet pipe is connected to a storage chamber or brake fluid reservoir which stores the brake fluid at close to atmospheric pressure. The side outlets of the two outlet valves are connected, via the channels 17 and 18, with the connecting pipes 19 and 20. These connecting pipes lead to the individual wheel brake cylinders at which the pressures are to be controlled.

As noted above, the two outlet valves are connected to a common brake fluid reservoir which acts to store the discharged fluid at substantially atmospheric pressure. When this reservoir is filled to a certain level, a level-sensing device actuates a microswitch which switches on a hydraulic fluid pump. This pump then conveys all the fluid in the reservoir back into the main pressure line which supplies the fluid to the inlet valves.

It will be understood that the above description of the present invention is susceptible to various modifications, changes and adaptations.

We claim:

1. A multiple valve arrangement comprising, in combination:
   a. a plurality of valve elements each composed of an individual valve body having two opposed ends and fluid openings only at its ends, there being at least one fluid opening at each of said ends;
   b. two holding members between which said valve elements are held and which engage said ends thereof, said holding members having channel means which communicate with said openings of said valve bodies; and
   c. clamping means connected directly between said holding members for clamping said valve elements between said holding members.

2. The valve arrangement defined in claim 1, wherein said channel means connect the openings of two or more of said valve elements together.

3. The valve arrangement defined in claim 1, wherein said valve elements include valve windings for electromagnetically actuating said elements.

4. The valve arrangement defined in claim 1, wherein said holding members are substantially plate shaped.

5. The valve arrangement defined in claim 1, wherein said valve elements are arranged in parallel.

6. The valve arrangement defined in claim 1, wherein at least one pair of said valve elements is arranged end-to-end on a common axis.

7. The valve arrangement defined in claim 6, wherein the fluid openings at the butting ends of said at least one pair of valve elements are connected together.

8. The valve arrangement defined in claim 7, further comprising housing means, surrounding at least said abutting ends.

9. The valve arrangement defined in claim 1, further comprising filter means arranged at at least one of said fluid openings of at least one of said valve elements for catching particles of dirt in the fluid passing therethrough.